Sept. 19, 1961   A. M. STOTT ET AL   3,000,173
GUNSIGHT RETRACTING THRUSTER
Filed Oct. 5, 1960

INVENTORS
ALBERT M. STOTT
HERBERT A. MAGNUS
BY
ATTORNEYS.

United States Patent Office 3,000,173
Patented Sept. 19, 1961

3,000,173
GUNSIGHT RETRACTING THRUSTER
Albert M. Stott, Aldan, Pa., and Herbert A. Magnus, Merchantville, N.J., assignors to the United States of America as represented by the Secretary of the Army
Filed Oct. 5, 1960, Ser. No. 60,762
3 Claims. (Cl. 60—26.1)
(Granted under Title 35, U.S. Code (1952), sec. 266)

The invention described herein may be manufactured and used by or for the Government for governmental purposes without the payment to us of any royalty thereon.

This invention relates to thrusters such as are utilized to operate or move various types of load devices, and has for its purpose the provision of an improved lock between the thruster piston and the member through which it actuates the load device. While the thruster of the present invention is shown as applied to the operation of a gunsight control mechanism it is applicable to other load devices.

In connection with the gunsight control mechanisms of some types of bombers, it is desirable to position the gunsight prior to the bombardier's ejection from the plane during emergency escape. Displacement of the gunsight is necessary to provide clearance for the bombardier's legs when he is ejected from the compartment. Ordinarily the gunsight is manually positioned into and retracted from the operating position. For this reason, a slip joint is arranged to permit manual operation without restraint. The present invention operatively associates with this slip joint a novel type of thruster which is susceptible of quick assembly and at the same time affords a means of absorbing kinetic energy so that the operated member of the slip joint may be locked in place at the end of the operating stroke.

The invention will be better understood from the following description when considered in connection with the accompanying drawings and its scope as indicated by the appended claims.

Referring to the drawings.

Figure 1:
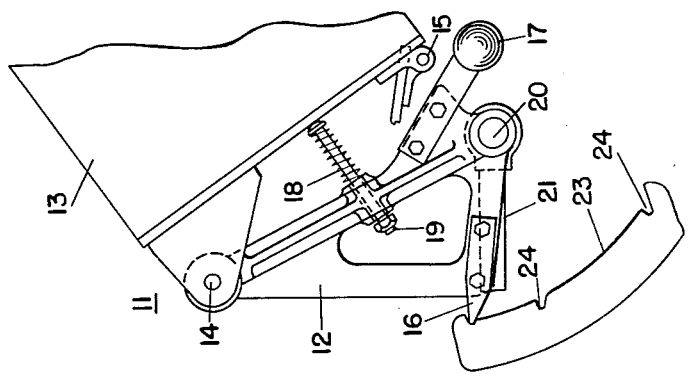
FIG. 1 illustrates a gunsight positioning mechanism.
Figure 2:
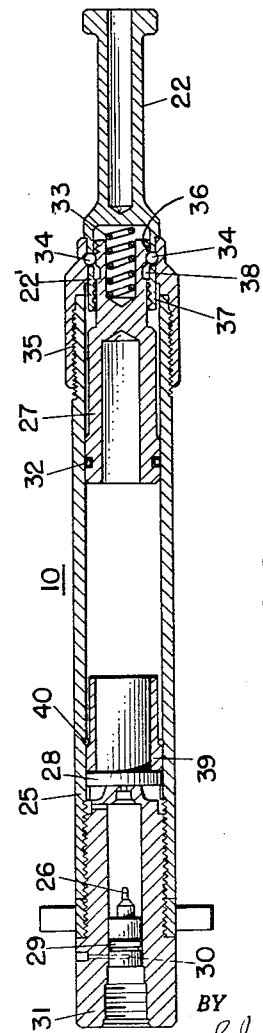
FIG. 2 illustrates a thruster which is adapted to operate the mechanism of FIG. 1.

The drawing shows a thruster 10 which functions in response to a gas pressure to operate a gunsight positioning mechanism 11. For ease of understanding, the thruster and positioning mechanism are shown slightly separated from one another.

The gun sight positioning mechanism includes a member 12 which is hinged to a gunsight 13 at the point 14. The gunsight 13 is pivoted on a fixed shaft 15. The member 12 has fixed to it an extension 16 and a manual operating handle 17 and is biased away from the gunsight by a spring 18 which is kept in place by a bolt 19 slidable through an opening in the member 12. Pivoted to the member 12 at the point 20 is a male member 21 which is slidable in a female member 22 to form the slip joint previously mentioned. The extension 16 is arranged to cooperate with a fixed quadrant 23 having notches 24.

In the illustrated position of the gunsight mechanism, the spring 18 keeps the extension 16 in engagement with a notch in the quadrant 23. This is its extended position. It is retracted from this position by movement of the handle 17 away from the quadrant 23. During this operation, the member 21 slides within the member 22, the pivot 14 moves toward the quadrant 23, and the gunsight 13 is rotated about the pivot 15 in a counterclockwise direction.

As previously indicated, this gunsight positioning mechanism was well known prior to the present invention which pertains more particularly to a gas pressure responsive device for automatically operating it in a timed relation with other parts of the aircraft's safety escape system.

This gas pressure responsive device includes, in addition to the sleeve 22, a body 25 which has at one end a firing pin 26 and at the other end a piston 27. This firing pin is arranged to fire a cartridge 28, is surrounded by a seal ring 29, is positioned by a shear pin 30, and is actuated to fire the cartridge in response to a gas pressure applied through the breech 31.

The case 39 of the cartridge 28 is fixed to the body 25 by a snap ring 40 which engages a groove on the interior of the body.

The piston 27 is surrounded by a seal ring 32, has a rod which extends into the enlarged end 22' of the sleeve 22, is biased away from the sleeve 22 by a spring 33, and is normally locked in its illustrated position by balls 34 which are positioned by an end cap 35 threaded onto the end of the body 25.

An important feature of this device is the lock between the piston 27 and the sleeve 22. This is formed by a male thread 36 on the piston rod, a female thread 37 on the sleeve and balls 34. It can be seen that there is possible limited relative movement between the piston and sleeve when the thread 36 is screwed into the thread 37 to a point where they become disengaged. Both threads are short in length with relatively long undercuts so that they afford a stop to movement of the piston and sleeve from one another. This is so because the opposed ends of the threads act as shoulders.

In assembly of the lock, the piston with the seal ring is pushed into the body until it abuts against a temporary assembly rod, the spring is placed in the end of the piston rod, and the parts are screwed together. This compresses the spring and pre-loads the joint. The specified value of the pre-load is based on the mass of the parts and the fact that the completely assembled lock must withstand a six foot drop test without coming apart.

Assembly of the lock is completed by pressing against the piston head while the spring is compressed by the sleeve to a point where the balls can be inserted. The body with end cap is then moved axially until it bottoms against the sleeve shoulder. In this position the lock balls are in line with the ball groove in the body. After this, the rod compressing the piston is removed, and under the action of the spring, the balls are forced out into the lock groove completing the lock assembly.

In the operation of the thruster, it may be fired manually, electrically or from an externally supplied high pressure gas such as that derived from an initiator. The term initiator is used herein to designate a device containing an explosive charge which is fired by percussion, electrically or otherwise for generating a gas pressure whereby a load device is actuated. If gas is utilized, it is applied through the breech 31 thereby forcing the firing pin 26 to shear the pin 30 and strike the primer of the cartridge 28. The fired primer ignites the igniter in the cartridge which in turn causes the propellant to burn and burst the cartridge case. The generated gas then acts on the piston 27 to produce a thrust force.

Since there is a relief undercut groove 38 cut into the piston rod, the initial motion of the piston releases the balls in the lock and the sleeve is unlocked. The piston then travels the length of the stroke while the gunsight mechanism which receives the thrust load unlocks, and moves to its retracted position. When the piston head shoulders against the body and end cap joint shoulder, the motion of the piston is stopped. At this time, the kinetic energy stored in the sleeve tends to strip it from the piston rod but this is prevented by the abutting ends of the threads 36 and 37 which act as shoulders to stop linear motion of the sleeve. Thus, the sleeve is prevented from becoming a projectile when the load is moved or released.

While the improved thruster has been illustrated as applied to the emergency operation of a gunsight control mechanism, it is equally applicable to other load devices such as the personnel ejectors and canopy openers of aircraft escape systems and the like.

We claim:

1. A thruster including a casing having an interior groove near its end, a load actuating member having a hollow end extending into said casing, said hollow end having perforations intermediate its ends and having an internal thread at its inner end, a piston movable within said casing and having a hollow rod extending into the hollow end of said member, said rod having at its inner end an external thread designed to cooperate with said internal thread and having an exterior groove, a spring tending to separate said piston from said member, and locking located in said perforations and extending between said interior groove and said rod for locking said member to said casing and receivable in said exterior groove upon movement of said piston for imparting to said member a movement which is terminated by the abutting of said threads.

2. A thruster according to claim 1 wherein said locking means is in the form of a ball.

3. A thruster according to claim 1 wherein said load actuating member is a sleeve designed to slide on a rod of the load device whereby the thruster and load device are interconnected through a slip joint.

References Cited in the file of this patent

UNITED STATES PATENTS

| | | |
|---|---|---|
| 2,726,576 | Musser | Dec. 13, 1955 |
| 2,926,638 | Magnus et al. | Mar. 1, 1960 |